Oct. 3, 1933.  W. F. KEEFER  1,929,358
BAKING PROCESS
Filed May 3, 1932
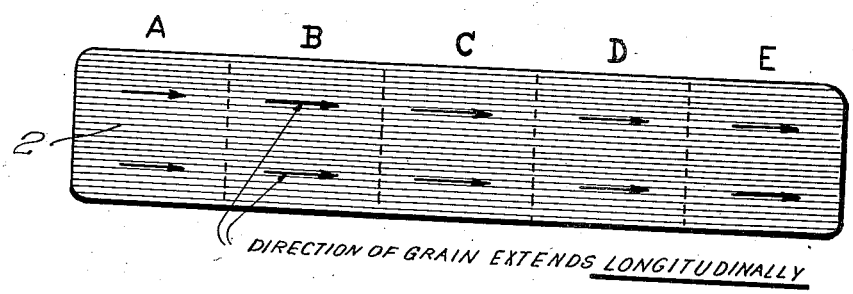
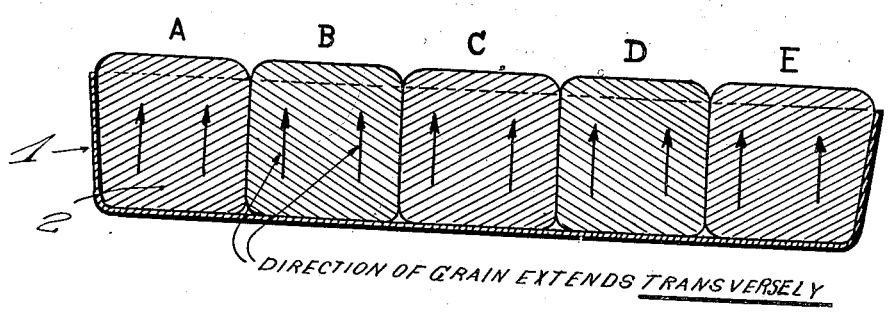
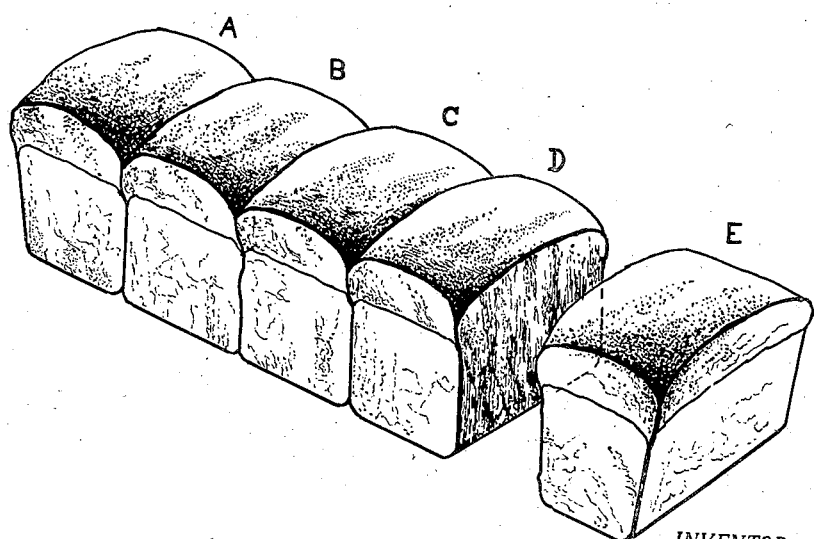
INVENTOR.
William F. Keefer,
BY
Jacobi & Jacobi ATTORNEYS.

Patented Oct. 3, 1933

1,929,358

UNITED STATES PATENT OFFICE 1,929,358

BAKING PROCESS

William F. Keefer, Flint, Mich., assignor to Liberty Baking Corporation, New York, N. Y., a corporation of Delaware Application May 3, 1932. Serial No. 609,015

4 Claims. (Cl. 107—54)

My invention relates to new and useful improvements in baking processes and more particularly to a process for baking bread, the primary object being to so bake bread that it may be formed into a number of segments readily severable from the loaf without irregularly tearing the bread.

A further object of the invention resides in forming a loaf with a number of equally divided and equally sized parts baked together and each part severable from the loaf without cutting.

Still another object resides in the method of baking a loaf which consists in cutting the dough prior to baking transversely into a number of parts, turning the parts to a position at right angles and causing them to adhere one to the other so that when baked, the parts may be readily severable without cutting.

With these and numerous other objects in view, my invention consists in the improved method as hereinafter and more particularly set forth.

In the drawing forming a part of this application:

Figure 1 is a sectional view showing a loaf of dough ordinarily made, illustrating the longitudinal extension of the grain of the dough and further illustrating in dotted lines the places where the dough is to be first cut in my process for baking;

Figure 2 is a longitudinal section through a pan of dough after the loaf of dough has been cut in the second step of my operation, illustrating the transverse extension of the grain of the dough in each of the segments with respect to the longitudinal length of the loaf; and Figure 3 is a perspective view of a loaf of bread baked under my improved process showing one segment thereof removed and illustrating the smooth and clean transverse grain of the dough between the segments which have been severed.

In describing the invention, I shall refer to the drawing in which similar reference characters designate corresponding parts throughout the several views and in which 1 designates a pan in which a loaf of bread is ordinarily baked and 2 designates the dough shaped into a loaf to be baked in said pan. When the ordinary loaf is formed, the grain of the dough extends longitudinally of the loaf. My invention contemplates the baking of a loaf in which the grain of the dough extends transversely and the loaf divided into a series of elements or segments which may be readily severable from the loaf without irregularly tearing the dough.

To this end, I desire to cut the loaf of dough 2, prior to its introduction to the pan into a plurality of segments designated by the letters A, B, C, D and E. Any form of cutting device may be used to divide the loaf of dough into a predetermined number of parts or segments. While I have shown the dough divided into five such parts or segments, it will be understood that any number may be provided.

After the segments or parts A to E, inclusive, have been formed by cutting, each of the segments is turned at right angles, as shown in Figure 2, so that the portions of the parts or segments forming the sides thereof by reason of the transverse cuts will become top or bottom of the completed loaf. When each of the parts or segments have been turned at right angles, these parts or segments are brought together to adhere one to the other and the thus completed loaf of dough is inserted in the pan 1 and baked in the usual manner. When the loaf is completed, it will be a single loaf scored transversely at regular intervals throughout its length and each of these parts or segments may be readily broken from the loaf by hand by tearing off same at the point of scoring. At the point of scoring the grain of the dough will be observed to extend transversely of the loaf so that the particular segments or parts may be readily severable from the loaf by tearing without irregularly tearing the dough. Cutting of the loaf with a knife is thus eliminated and each part or segment of the loaf, if made sufficiently wide, may be in turn sliced by a knife, as desired. Thus great economy may be had in the use of a loaf of bread so baked, as a housewife may find it only necessary at times to remove from the loaf a single segment or part instead of utilizing the entire loaf from which to slice a few pieces of bread for consumption.

It will be understood that the ingredients of the dough are the same as usual and the original loaf is formed in the usual manner. An important feature of the invention involves the slicing of the original loaf of dough transversely at predetermined points and the turning of the parts or segments at right angles and baking of the same then together into one loaf, so that the grain of the dough will extend crosswise or transversely of the dough. This enables the segments or slices to be readily removed by hand from the loaf without irregularly breaking the dough and further enables just sufficient bread to be removed from the loaf as may be desired at any particular time.

From the foregoing description of the method pursued in the baking of the loaf, the means to accomplish the same will be readily understood and it will be seen that I have provided simple and inexpensive means for carrying out the objects of the invention.

Having thus described the invention, what I claim is:

1. The method of baking a single loaf of bread consisting in preparing dough and shaping the same into a loaf, cutting the loaf of dough transversely at predetermined intervals longitudinally thereof to form a plurality of separate segments, turning the segments at right angles, bringing the turned segments to adhering relation one to the other to form a composite loaf and baking the same together in a single pan to form a completed bread loaf having separable sections.

2. The method of baking a single loaf of bread consisting in preparing a loaf of unbaked dough having longitudinally extending grain, severing the loaf of dough transversely at spaced intervals longitudinally thereof to form a plurality of separate segments, turning of the segments to a position to cause the grain of the dough to extend transversely of the loaf, positioning of the turned segments in adhering relationship one to the other and baking said loaf in an open pan to produce a composite loaf scored at predetermined intervals.

3. A loaf of bread formed of a plurality of initially separate segments of dough adhering to each other when baked to form a composite loaf of dough, each segment having the grain of the dough thereof extending in a direction substantially at right angles to the length of the loaf, the junction of the segments one to the other forming scored portions on the upper face of said loaf to enable said segments to be individually and cleanly torn manually from each other and individually sliced.

4. The method of baking a single loaf of bread consisting of forming a loaf of unbaked dough having longitudinally extending grain, cutting the loaf transversely at spaced intervals to form a plurality of separate sections, turning the sections to a position in which grain of the sections extend transversely of the loaf, placing the turned sections in proximity to each other in position to adhere as they rise and form a composite loaf of separable sections when baked, and then baking the assembled loaf.

WILLIAM F. KEEFER.